(12) United States Patent
Morefield et al.

(10) Patent No.: US 10,142,416 B2
(45) Date of Patent: Nov. 27, 2018

(54) METHODS FOR FACILITATING PLANNED DATA CONTAINER TRANSITIONS AND DEVICES THEREOF

(71) Applicant: NetApp, Inc., Sunnyvale, CA (US)

(72) Inventors: James Robert Morefield, Apex, NC (US); Joseph Brown, Raleigh, NC (US)

(73) Assignee: NETAPP, INC., Sunnyvale, CA (US)

( * ) Notice: Subject to any disclaimer, the term of this patent is extended or adjusted under 35 U.S.C. 154(b) by 312 days.

(21) Appl. No.: 15/167,919

(22) Filed: May 27, 2016

(65) Prior Publication Data

US 2017/0346895 A1    Nov. 30, 2017

(51) Int. Cl.
*H04L 29/08* (2006.01)
*G06F 3/06* (2006.01)

(52) U.S. Cl.
CPC ........ *H04L 67/1095* (2013.01); *G06F 3/0647* (2013.01); *H04L 67/1097* (2013.01); *H04L 67/2842* (2013.01); *G06F 3/065* (2013.01); *G06F 3/067* (2013.01); *G06F 3/0652* (2013.01)

(58) Field of Classification Search
CPC ...... G06F 3/0647; G06F 3/065; G06F 3/0652; H04L 67/1095; H04L 67/1097
See application file for complete search history.

(56) References Cited

U.S. PATENT DOCUMENTS

| | | | | |
|---|---|---|---|---|
| 7,386,664 | B1 * | 6/2008 | Roy | G06F 11/2082 |
| | | | | 711/114 |
| 7,441,081 | B2 * | 10/2008 | Humlicek | G06F 12/0804 |
| | | | | 711/113 |
| 9,063,908 | B2 * | 6/2015 | Loaiza | G06F 11/2082 |
| 2010/0306488 | A1 * | 12/2010 | Stroberger | G06F 11/2064 |
| | | | | 711/162 |
| 2015/0363480 | A1 * | 12/2015 | Vijayakumari Rajendran Nair .... | |
| | | | | G06F 17/30581 |
| | | | | 707/622 |
| 2016/0203078 | A1 * | 7/2016 | Ragupathi | G06F 3/06 |
| | | | | 711/170 |
| 2016/0378399 | A1 * | 12/2016 | Hedge | G06F 3/0652 |
| | | | | 711/166 |
| 2017/0206027 | A1 * | 7/2017 | Nakajima | G06F 3/0619 |
| 2017/0235639 | A1 * | 8/2017 | Vijayakumari Rajendran Nair .... | |
| | | | | G06F 11/1446 |
| | | | | 707/624 |

(Continued)

*Primary Examiner* — Oleg Survillo
(74) *Attorney, Agent, or Firm* — LeClairRyan PLLC

(57) ABSTRACT

A method, non-transitory computer readable medium, and source storage server computing device that mirrors dirty data to a destination storage server. The dirty data corresponds to storage operations not yet committed to one or more data storage devices of an aggregate to be transitioned. Ownership of the data storage devices is released. Teardown processing for the aggregate is performed subsequent to releasing ownership of the data storage devices. With this technology, the flushing or committing of dirty data to data storage devices is performed by a destination storage server after a data container is transitioned to the destination storage server. Additionally, non-critical teardown processing is also performed after a data container or aggregate is transitioned to the destination storage server. Accordingly, the duration of planned data container transitions can advantageously be reduced and aggregates can be brought online by a destination storage server for data access by applications more quickly.

18 Claims, 4 Drawing Sheets

(56) References Cited

U.S. PATENT DOCUMENTS

| | | | |
|---|---|---|---|
| 2017/0257357 A1* | 9/2017 | Wang | H04L 63/08 |
| 2017/0277443 A1* | 9/2017 | Deguchi | G06F 3/0611 |
| 2017/0315725 A1* | 11/2017 | McKean | G06F 3/061 |
| 2017/0318089 A1* | 11/2017 | Pandit | G06F 11/2069 |
| 2018/0129255 A1* | 5/2018 | Hegde | G06F 3/067 |

* cited by examiner

METHODS FOR FACILITATING PLANNED DATA CONTAINER TRANSITIONS AND DEVICES THEREOF

FIELD

This technology relates to managing data storage networks, and more particularly to methods and devices for facilitating planned transitions of data containers between storage servers in a data storage network.

BACKGROUND

Storage servers in storage networks generally store data across multiple data storage devices that together comprise a data container, which is also referred to herein as an aggregate. Storage servers may employ various forms of data storage devices, such as hard disk drives, solid state drives, flash drives, or tape devices, for example. The data storage devices typically host one or more storage volumes associated with file systems that define an overall logical arrangement of storage space in a storage network.

To improve performance of the storage network, data containers are often transitioned or relocated from a source storage server to a destination storage server. Generally ownership of the data storage devices that comprise the data container is released by a source storage server and obtained by a destination storage server. Subsequent to the transition, the destination storage server processes storage operations that are received from client devices and associated with data maintained in the transitioned data container.

The transition of a data container requires a significant number of processing steps relating to the teardown of the filesystem related data structures and memory by a source storage server that is currently performed before the data container is brought online by a destinations storage server. Additionally, dirty data, relating to in-flight or outstanding storage operations that were not committed to data storage devices prior to the transition being initiated, is currently flushed to data storage devices by a source storage server prior to releasing ownership of the data storage devices.

Accordingly, data container transition currently requires a significant amount of time during which the data container is unavailable to client devices to service storage requests. The delay is particular acute for source storage servers that are overloaded and experience prolonged teardown processing due to system contention.

DETAILED DESCRIPTION

Figure 1:
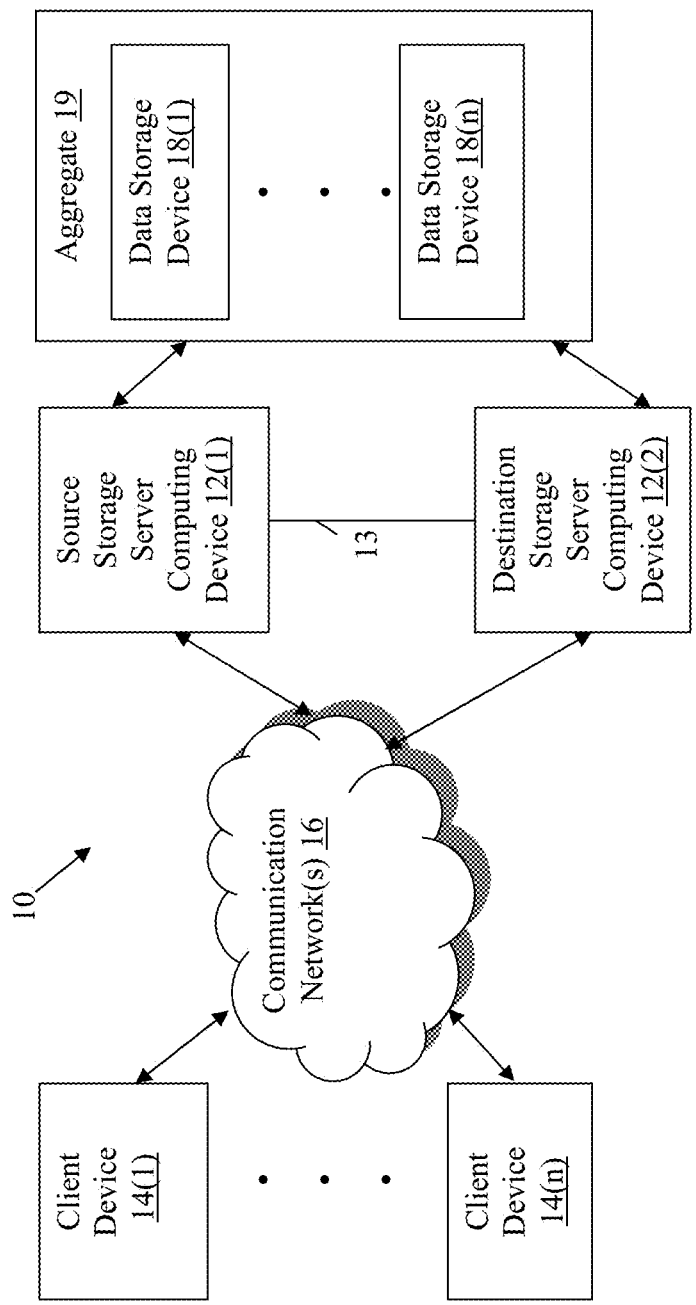
FIG. 1 is a block diagram of a network environment with exemplary source and destination storage server computing devices.

A network environment 10 including exemplary source and destination storage server computing devices 12(1) and 12(2), respectively, coupled together by an interconnect 13 is illustrated in FIG. 1. The source and destination storage server computing devices 12(1) and 12(2) in this example are coupled to client devices 14(1)-14(n) via communication network(s) 16 and data storage devices 18(1)-18(n), together comprising an aggregate 19, via another communication network, direct connection, or switch (not shown), although this network environment 10 can include other numbers and types of systems, devices, components, and/or elements in other configurations. The network environment 10 may also include other devices such as one or more routers and/or switches, for example, which are well known in the art and thus will not be described herein. This technology provides a number of advantages including methods, non-transitory computer readable media, and devices that more efficiently facilitate planned data container transitions and reduce the duration that a transitioned data container is unavailable for external access.

Figure 2:
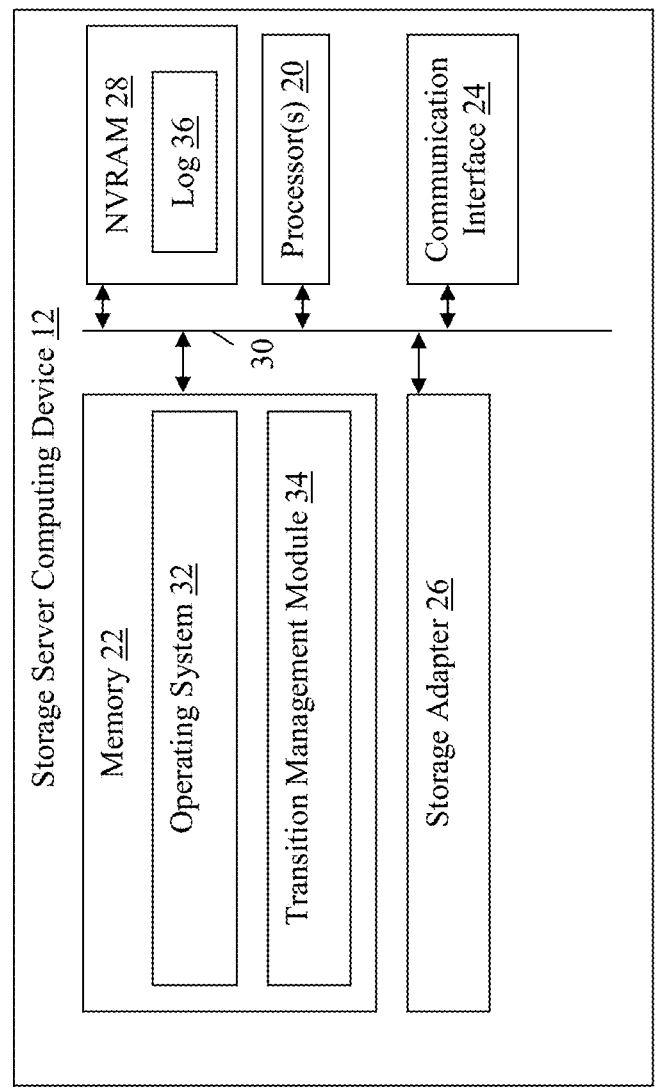
FIG. 2 is a block diagram of an exemplary one of the storage server computing device shown in FIG. 1.

Referring to FIG. 2, a block diagram of an exemplary one of the source storage server computing devices 12(1) or 12(2) is illustrated. The storage server computing device 12 generally provides file services relating to the organization of information on the data storage devices 18(1)-18(n) on behalf of the client devices 14(1)-14(n). In this particular example, the storage server computing device 12 includes processor(s) 20, a memory 22, a communication interface 24, a storage adapter 26, and a non-volatile random access memory (NVRAM) 28, which are coupled together by a bus 32 or other communication link.

The processor(s) 20 of the storage server computing device 12 may execute a program of stored instructions for one or more aspects of the this technology, as described and illustrated by way of the embodiments herein, although the processor(s) 20 could execute other numbers and types of programmed instructions. The processor(s) 20 in the storage server computing device 12 may include one or more central processing units (CPUs) or general purpose processors with one or more processing cores, for example.

The memory 22 of the storage server computing device 12 may include any of various forms of read only memory (ROM), random access memory (RAM), flash memory, non-volatile or volatile memory, or the like, or a combination of such devices, for example. In this example, the memory includes an operating system 32 and a transition management module 34, although other types and/or numbers of applications or modules can also be included in other examples.

The operating system 32 is configured to functionally organize stored data by invoking storage operations to facilitate file services provided by the storage server computing device 12. In particular, the operating system 34 implements a file system to logically organize information as a hierarchical structure of directories and files on the data storage devices 18(1)-18(n). Accordingly, the operating system 34 cooperates with the storage adapter 28 to access information requested by the client devices 14(1)-14(n) and stored on the data storage devices 18(1)-18(n), among other functions.

The transition management module 34 in this example is configured to transition a data container, such as the aggregate 19 to another storage server computing device in the network environment 10. Generally, the transition management module 34 facilitates teardown processing for a data container on behalf of a source storage server computing device and bringing the data container online on behalf of a destination storage server computing device, as described and illustrated in more detail later.

The communication interface 24 of the storage server computing device 12 can include one or more network interface controllers (NICs) for operatively coupling and communicating between the storage server computing device 12 and the client devices 14(1)-14(n), which are coupled together by the communication network(s) 16, although other types and numbers of communication networks or systems with other types and numbers of connections and configurations to other devices and elements also can be used.

By way of example only, the communication network(s) 16 can use TCP/IP over Ethernet and industry-standard protocols, including NFS, CIFS, SOAP, XML, LDAP, and SNMP, although other types and numbers of communication networks, can be used. The communication network(s) 16 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 16 may also comprise any local area network and/or wide area network (e.g., Internet), although any other type of traffic network topologies may be used.

The storage adapter 26 can cooperate with the operating system 32 to access information requested by the client devices 14(1)-14(n). The information may be stored on the data storage devices 18(1)-18(n) in logical volumes, for example. The storage adapter 26 includes input/output (I/O) or communication interface circuitry that couples to the data storage devices 18(1)-18(n) over an I/O interconnect arrangement such as a conventional high-performance, Fibre Channel serial link topology, SAS, SCSI, or SATA, for example. The storage adapter 26 can communicate with the data storage devices 18(1)-18(n) over a network (e.g., a cloud network) or switch (not shown). The data storage devices 18(1)-18(n) can be housed in an enclosure, such as a shelf or rack, for example, and the data storage devices 18(1)-18(n) can also be located elsewhere in the network environment 10.

The NVRAM 28 in this particular example provides fault-tolerant backup of data, enabling the integrity of storage operations to survive a service interruption based on a power failure or other fault. Additionally, the NVRAM 28 allows some storage operations (e.g., write and delete requests) received from the client devices 14(1)-14(n) to be acknowledged before being committed to the data storage devices 18(1)-18(n) asynchronously. The size of the NVRAM 28 can be variable and optionally sufficiently large to log a predefined number of storage operations and associated data.

The NVRAM 28 can store a log 36, which can be a file or other data structure that is used to journal storage operations in sequential order as received from the client devices 14(1)-14(n). As the storage server computing device 12 receives storage operations (e.g., to create files, write data, etc.), the storage server computing device 12 can first store them in the log 36. When replayed, the result is as if the received storage operations were directly committed to the data storage devices 18(1)-18(n). In some examples, other persistent media may be employed to store the log 36, e.g., solid state drives or other non-volatile storage.

Referring back to FIG. 1, each of the client devices 14(1)-14(n) in this example includes a processor, a memory, a communication interface, and optionally an input device, and a display device, which are coupled together by a bus or other link, although each of the client devices 14(1)-14(n) can have other types and numbers of components or other elements and other numbers and types of network devices could be used.

The client devices 14(1)-14(n) may run interface applications that provide an interface to make requests for and send content and/or data to the storage server computing device 12 via the communication network(s) 16, for example. Each of the client devices 14(1)-14(n) may be a conventional personal computer, a tablet computing device, a smart phone, a virtual machine running in a cloud, an application server hosting applications that utilize backend storage, or other processing and/or computing device, for example.

The data storage devices 18(1)-18(n) can be hard disk drives, solid state drives, flash drives (e.g., in an all flash array), optical disk-based storage, any combination thereof, or any other type of stable, non-volatile storage suitable for storing files or objects in storage volumes for short or long term retention, for example. The data storage devices 18(1)-18(n) together comprise the aggregate 19 in this example and optionally host one or more volumes based on a Redundant Array of Inexpensive Disks (RAID) architecture or other topology facilitating data persistency, although other types and numbers of volumes in other topologies can also be used.

Although examples of the source and destination storage server computing devices 12(1) and 12(1), respectively, client devices 14(1)-14(n), and data storage devices 18(1)-18(n), are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
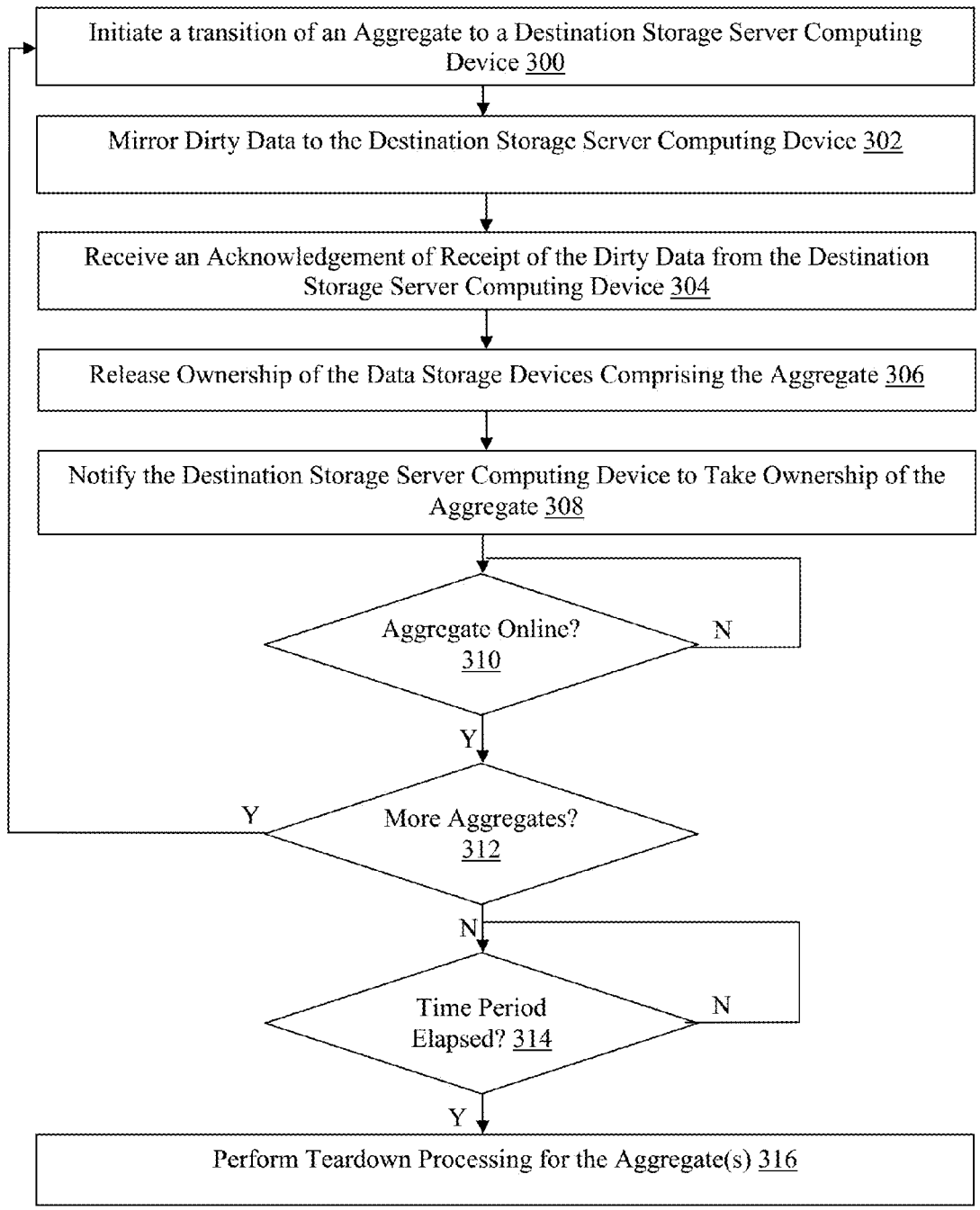
FIG. 3 is a flowchart of an exemplary method for facilitating planned data container transitions by the exemplary source storage server computing device shown in FIG. 1.

An exemplary method for facilitating planned data container transitions will now be described with reference to FIGS. 1-4. Referring more specifically to FIG. 3, a flowchart of an exemplary method for facilitating planned data container transitions by the source storage server computing device 12(1) is illustrated. In step 300 in this particular example, the source storage server computing device 12(1) initiates a transition of the aggregate 19 to the destination storage server computing device 12(2). The source storage server computing device 12(1) can initiate the transition of the aggregate 19 in response to instructions received from an administrator or based on an automated process and current network conditions, for example.

In order to initiate the transition of the aggregate 19, the source storage server computing device 12(1) can mark the aggregate 19, and/or one or more volumes associated with the aggregate 19, as unavailable to service storage operations received from the client devices 14(1)-14(n). Additionally, the source storage server computing device 12 also sends a notification of the transition, which includes an indication of the aggregate 19, to the destination storage server computing device 12(2). The notification sent in step 300 can be received by the destination storage server computing device 12(2) as described and illustrated in more detail later with reference to step 400 of FIG. 4. Other steps can also be taken by the source storage server computing device 12(1) as part of initiating the transition of the aggregate 19 in step 300.

Referring back to FIG. 3, in step 302, the source storage server computing device 12(1) mirrors dirty data to the destination storage server computing device 12(2), such as via the interconnect 13 for example. The dirty data corresponds to storage operations (e.g., write requests received from the client devices 14(1)-14(n)) that have not yet been committed to one or more of the data storage devices 18(1)-18(n) of the aggregate 19. In one example, dirty data can be associated with buffers allocated by the operating system 32, in order to process storage operations from the log 36 in the NVRAM 28, but not yet flushed or committed to the data storage device(s) 18(1)-18(n), although other types of dirty data can also be mirrored in step 302.

With this technology, the destination storage server computing device 12(2) commits the dirty data to the data storage device(s) 18(1)-18(n), as described and illustrated in more detail later, and the transition of the aggregate 19 can proceed without having to wait for the source storage server computing device 12(1) to commit the dirty data. Therefore, the destination storage server computing device 12(2) can receive storage operations associated with the aggregate 19 from the client devices 14(1)-14(n) in parallel with committing the dirty data to the data storage device(s) 18(1)-18(n), resulting in a more efficient transition of the aggregate 19, also as described and illustrated in more detail later.

In step 303, the source storage server computing device 12(1) receives an acknowledgement of receipt of the dirty data from the destination storage server computing device 12(2). The acknowledgement can also be received via the interconnect 13, for example, and other types and numbers of synchronization messages can also be exchanged in order to facilitate the mirroring of the dirty data to the destination storage server computing device 12(2).

In step 304 in this example, the source storage server computing device 12(1) effectively erects a fence to wall off the aggregate 19. Prior to changing ownership, as described and illustrated in more detail later with reference to step 408 of FIG. 4, the aggregate 19 is in a temporal state in which it cannot process new client operations received from the client devices 14(1)-14(n). The destination storage server computing device 12(2) does not own the data storage devices 18(1)-18 n) for the migrating aggregate 19 during this period so it cannot write allocate or destage the mirrored dirty data. Accordingly, the destination storage server computing device 12(2) can buffer the data until ownership is changed and passively mounted volumes become writable, as described and illustrated in more detail later with reference to step 402 of FIG. 4.

In step 305, the source storage server computing device 12(1) performs critical teardown processing for the aggregate 19. Some teardown processing is critical and cannot be deferred, such as marking the inode cache stale in the critical transition window, although the purging of the inodes is non-critical and can be deferred and performed as described and illustrated in more detail later with reference to step 316 of FIG. 3. Other types of teardown activities are also critical and must be performed in step 305.

In step 306, the source storage server computing device 12(1) releases ownership of the data storage devices 18(1)-18(n) that together comprise the aggregate 19. Ownership, as well as availability, of the aggregate 19, storage devices 18(1)-18(n), and/or volumes hosted by the data storage devices 18(1)-18(n) can be updated and maintained in a table or other data structure that is replicated and stored by the source and destination storage server computing devices 12(1) and 12(2), respectively, as well as by any other storage servers that may be present in the network environment 10.

Accordingly, the source storage server computing device 12(1) can updated a table, for example, stored in the memory 22 by both the source and destination storage server computing devices 12(1) and 12(2) in order to reflect the releasing of ownership of the data storage devices 18(1)-18(n). In other examples, ownership of the data storage devices 18(1)-18(n) can be maintained directly on the data storage devices 18(1)-18(n) (e.g., in metadata), and other methods of maintaining and updating ownership information for the data storage devices 18(1)-18(n) can also be used.

In step 308, the source storage server computing device 12(1) sends a notification to the destination storage server computing device 12(2), via the interconnect 13 for example, indicating that the destination storage server computing device 12(2) should now take ownership of the aggregate 19 and associated data storage devices 18(1)-18(n). The notification sent in step 308 can be received by the destination storage server computing device 12(2) as described and illustrated in more detail later with reference to step 406 of FIG. 4.

Referring back to FIG. 3, in step 310, the source storage server computing device 12(1) determines whether the aggregate 19 has been brought online by the destination storage server computing device 12(2). The determination can be based on a communication from the destination storage server computing device 12(2), for example, although other methods of determining whether the aggregate 19 has been brought online can also be used. The destination storage server computing device 12(2) can bring the aggregate 19 online as described and illustrated in more detail later with reference to step 412 of FIG. 4, for example.

Referring back to FIG. 3, in step 312, the source storage server computing device 12(1) determines whether more aggregates are scheduled to be transitioned to the destination storage server computing device 12(2). If the source storage server computing device 12(1) determines that there are more aggregates to transition, then the Yes branch is taken back to step 300 in this particular example.

However, if the source storage server computing device 12(1) determines that there are no more aggregates to be transitioned currently, then the No branch is taken to step 314.

In step 314, the source storage server computing device 12(1) in this example determines whether an established time period has elapsed. In other examples, other conditions can be used in step 314, such as a specified time of day or threshold utilization of the source storage controller computing device 12(1), for example. If the source storage server computing device 12(1) determines that the specified time period has not elapsed, then the No branch is taken back to step 314 and the source storage server computing device 12(1) effectively waits for the time period to elapse. However, if the source storage server computing device 12(1) determines that the time period has elapsed, then the Yes branch is taken to step 316.

In step 316, the source storage server computing device 12(1) performs non-critical teardown processing for the aggregate 19, as well as any other aggregate(s) that may have been transitioned before the time period elapsed. The teardown processing can include non-critical operations, such as unloading or invalidating inodes, removing metadata associated with the aggregate 19, cleansing of data structures of the aggregate 19, freeing of memory associated with the aggregate 19, purging system caches, or verifying cleanup completion, for example, although other types of operations can also be included in the teardown processing.

Accordingly, in this particular example, the teardown processing for the aggregate 19 is delayed so as to be batched with teardown processing for one or more other aggregates or to be performed at an optimal time when the source storage server computing device 12(1) may be less busy. In other examples, the source storage server computing device 12(1) can perform the teardown processing prior to optional steps 312 and 314.

However, the teardown processing with this technology is advantageously performed after the destination storage server computing device 12(2) has brought the aggregate online in step 310. By deferring the teardown processing until after the aggregate 19 has been brought online by the destination storage server computing device 12(2), the duration of the transition of the aggregate 19 can be reduced and storage operations received from the client devices 14(1)-14(n) can be processed earlier with this technology.

Figure 4:
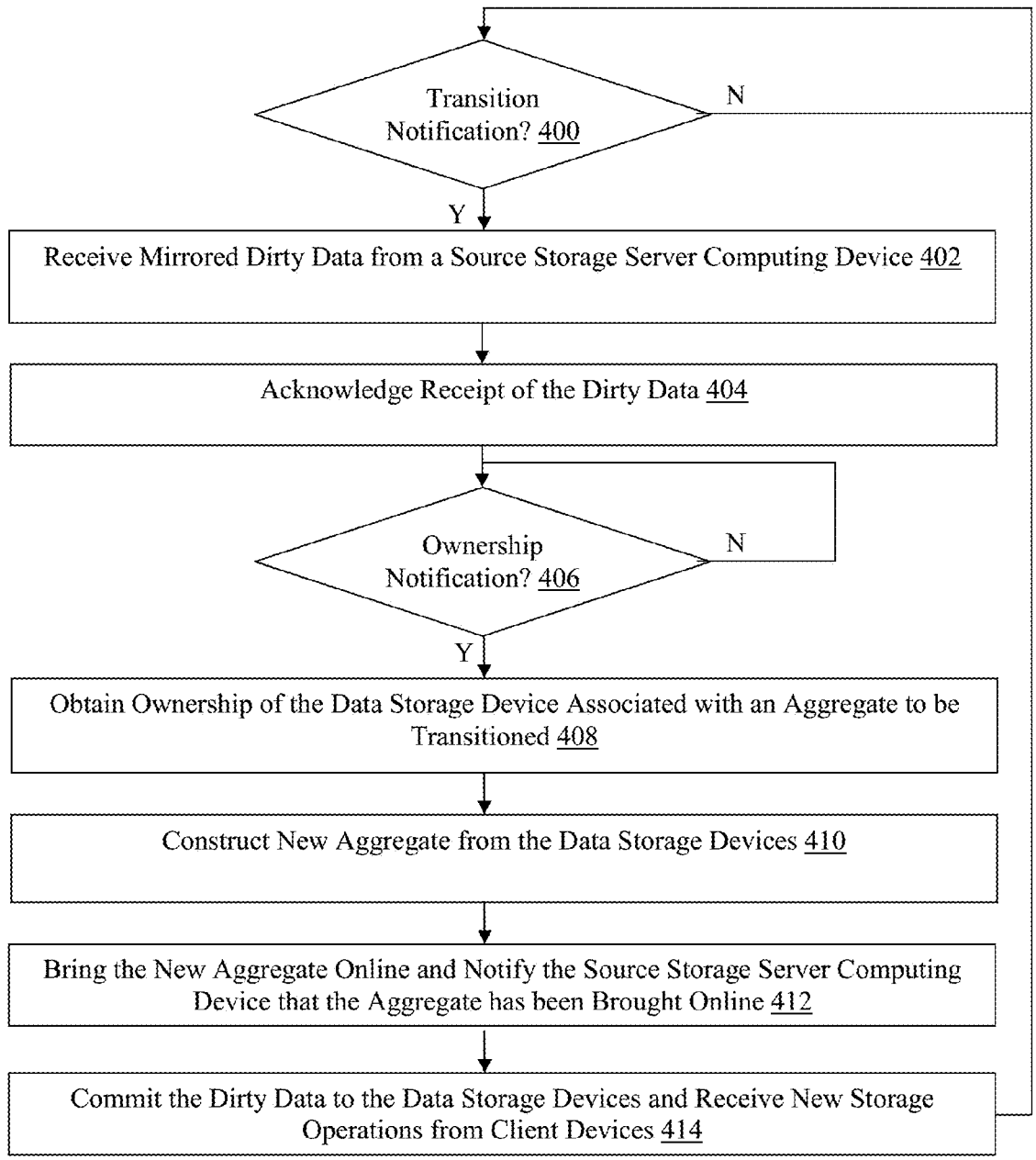
FIG. 4 is a flowchart of an exemplary method for facilitating planned data container transitions by the exemplary destination storage server computing device shown in FIG. 1.

Referring more specifically to FIG. 4, a flowchart of an exemplary method for facilitating planned data container transitions by the destination storage server computing device 12(2) is illustrated. In step 400 in this particular example, the destination storage server computing device 12(2) determines whether a transition notification has been received from the source storage server computing device 12(1). The transition notification can be sent via the interconnect 13 as described and illustrated in more detail earlier with reference to step 300 of FIG. 3.

Referring back to FIG. 4, if the destination storage server computing device 12(2) determines in step 400 that a transition notification is not received, then the No branch is taken back to step 400 and the destination storage server computing device 12(2) continues processing storage operations from the client devices 14(1)-14( n) and effectively waits for a transition notification to be received. However, if the destination storage server computing device 12(2) determines that a transition notification has been received, then the Yes branch is taken to step 402.

In step 402, the destination storage server computing device 12(2) passively mounts the volume(s) associated with the aggregate 19 and receives mirrors dirty data, optionally via the interconnect 13, from the source storage server computing device 12(1). In order to passively mount the volumes, the destination storage server computing device 12(2) assimilates the data storage devices 18(1)-18( n) and creates logical containers (e.g., aggregates, volumes etc.) for at least those of the data storage devices 18(1)-18(n) not owned by the destination storage server computing device 12(2). Prior to passively mounting volumes, received mirrored dirty data can be buffered. The mirrored dirty data is committed to the data storage device(s) 18(1)-18(n) by the destination storage server computing device 12(2), as described and illustrated in more detail later with reference to step 414 of FIG. 4.

In step 404, the destination storage server computing device 12(2) sends an acknowledgement of receipt of the dirty data to the source storage server computing device 12(1). The acknowledgement can be sent via the interconnect 13, for example, and other types or number of synchronization messages can also be exchanged between the destination storage server computing device 12(2) and the source storage server computing device 12(1) in order to facilitate the exchange of the dirty data.

In step 406, the destination storage server computing device 12(2) determines whether a notification to take ownership of the aggregate 19, and associated data storage devices 18(1)-18(n), is received from the source storage server computing device 12(1). The notification can be sent via the interconnect 13 and can include an indication of the aggregate 19 and/or data storage devices 18(1)-18(n) for which the destination storage server computing device 12(2) is to obtain ownership.

If the destination storage server computing device 12(2) determines that an ownership notification is not received from the source storage server computing device 12(1), then the No branch is taken back to step 406 and the destination storage server computing device 12(2) effectively waits for the ownership notification to be received. However, if the destination storage server computing device 12(2) determines that an ownership notification has been received, then the Yes branch is taken to step 408.

In step 408, the destination storage server computing device 12(2) obtains ownership of the data storage devices 18(1)-18(n) associated with the aggregate 19. Ownership can be obtained by updating a table or other data structure that is hosted in the memory 22 and replicated to the source storage server computing device 12(1) and any other storage server computing devices in the network environment 10, for example. In another example, ownership of the data storage devices 18(1)-18(n) can be obtained based on storing information in metadata of the data storage devices 18(1)-18(n), and other methods of obtaining ownership of the data storage devices 18(1)-18(n) can also be used.

In step 412, the destination storage server computing device 12(2) brings the new aggregate, constructed in step 402, online. In step 412, the destination storage server computing device 12(2) also notifies the source storage server computing device 12(1), using the interconnect 13, that the new aggregate has been brought online for external access by the client devices 14(1)-14(n).

In step 414, the destination storage server computing device 12(2) commits the dirty data received in step 402 to the data storage devices 18(1)-18(n) and, in parallel, receives new storage operations from the client devices 14(1)-14(n). The transition of the aggregate 19 in this example occurs prior to incurring the cost of committing the dirty data to the data storage devices 18(1)-18(n).

Accordingly, this technology advantageously defers flushing of dirty data to data storage devices of an aggregate, as well as non-critical teardown processing for the aggregate, until after transition of the aggregate to another storage server computing device. Therefore, with this technology, a data container or aggregate can advantageously be transitioned relatively quickly, resulting in reduced unavailability for client devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   mirroring, by a source computing device, dirty data to a destination computing device, the dirty data corresponding to storage operations not yet committed to one or more storage devices of an aggregate to be transitioned;
   releasing, by the source computing device, ownership of the storage devices subsequent to mirroring the dirty data to the destination computing device; and
   performing, by the source computing device, teardown processing for the aggregate subsequent to releasing ownership of the storage devices.

2. The method of claim 1, further comprising prioritizing, by the source computing device, operating system scheduling for one or more pending file system storage operations associated with the aggregate prior to mirroring the dirty data to the destination computing device.

3. The method of claim 1, further comprising receiving, by the source computing device, an acknowledgement of the dirty data from the destination computing device prior to releasing ownership of the storage devices.

4. The method of claim 1, further comprising performing, by the source computing device, the teardown processing for the aggregate and one or more other aggregates, when an established time period has expired.

5. The method of claim 1, wherein the mirroring, releasing, and performing together comprise transitioning the aggregate to the destination computing device and the method further comprises repeating, by the source computing device, the transitioning for one or more other aggregates, when the aggregate has been brought online by the destination computing device.

6. The method of claim 1, wherein the storage operations are logged and the dirty data corresponds to one or more buffers allocated by an operating system to facilitate processing of the logged storage operations.

7. A non-transitory machine readable medium having stored thereon instructions for facilitating planned data container transitions comprising machine executable code which when executed by at least one machine causes the machine to:
   mirror dirty data to a destination computing device, the dirty data corresponding to storage operations not yet committed to one or more storage devices of an aggregate to be transitioned;
   release ownership of the storage devices subsequent to mirroring the dirty data to the destination computing device; and
   perform teardown processing for the aggregate subsequent to releasing ownership of the storage devices.

8. The non-transitory machine readable medium of claim 7, wherein the machine executable code when executed by the machine further causes the machine to prioritize operating system scheduling for one or more pending file system storage operations associated with the aggregate prior to mirroring the dirty data to the destination computing device.

9. The non-transitory machine readable medium of claim 7, wherein the machine executable code when executed by the machine further causes the machine to receive an acknowledgement of the dirty data from the destination computing device prior to releasing ownership of the storage devices.

10. The non-transitory machine readable medium of claim 7, wherein the machine executable code when executed by the machine further causes the machine to perform the teardown processing for the aggregate and one or more other aggregates, when an established time period has expired.

11. The non-transitory machine readable medium of claim 7, wherein the mirroring, releasing, and performing together comprise transitioning the aggregate to the destination computing device and the machine executable code when executed by the machine further causes the machine to repeat the transitioning for one or more other aggregates, when the aggregate has been brought online by the destination computing device.

12. The non-transitory machine readable medium of claim 7, wherein the storage operations are logged and the dirty data corresponds to one or more buffers allocated by an operating system to facilitate processing of the logged storage operations.

13. A source computing device, comprising:
   a memory containing machine readable medium comprising machine executable code having stored thereon instructions for facilitating planned data container transitions; and
   a processor coupled to the memory, the processor configured to execute the machine executable code to cause the processor to:
      mirror dirty data to a destination computing device, the dirty data corresponding to storage operations not yet committed to one or more storage devices of an aggregate to be transitioned;
      release ownership of the storage devices subsequent to mirroring the dirty data to the destination computing device; and
      perform teardown processing for the aggregate subsequent to releasing ownership of the storage devices.

14. The source computing device of claim 13, wherein the processor is further configured to execute the machine executable code to further cause the processor to prioritize operating system scheduling for one or more pending file system storage operations associated with the aggregate prior to mirroring the dirty data to the destination computing device.

15. The source computing device of claim 13, wherein the processor is further configured to execute the machine executable code to further cause the processor to receive an acknowledgement of the dirty data from the destination computing device prior to releasing ownership of the storage devices.

16. The source computing device of claim 13, wherein the processor is further configured to execute the machine executable code to further cause the processor to perform the teardown processing for the aggregate and one or more other aggregates, when an established time period has expired.

17. The source computing device of claim 13, wherein the mirroring, releasing, and performing together comprise transitioning the aggregate to the destination computing device and the processor is further configured to execute the machine executable code to further cause the processor to repeat the transitioning for one or more other aggregates, when the aggregate has been brought online by the destination computing device.

18. The source computing device of claim 13, wherein the storage operations are logged and the dirty data corresponds to one or more buffers allocated by an operating system to facilitate processing of the logged storage operations.

* * * * *